No. 829,352. PATENTED AUG. 21, 1906.
G. C. RALSTON.
DEVICE FOR OPERATING BULKHEAD DOORS.
APPLICATION FILED JUNE 8, 1904.
4 SHEETS—SHEET 1.
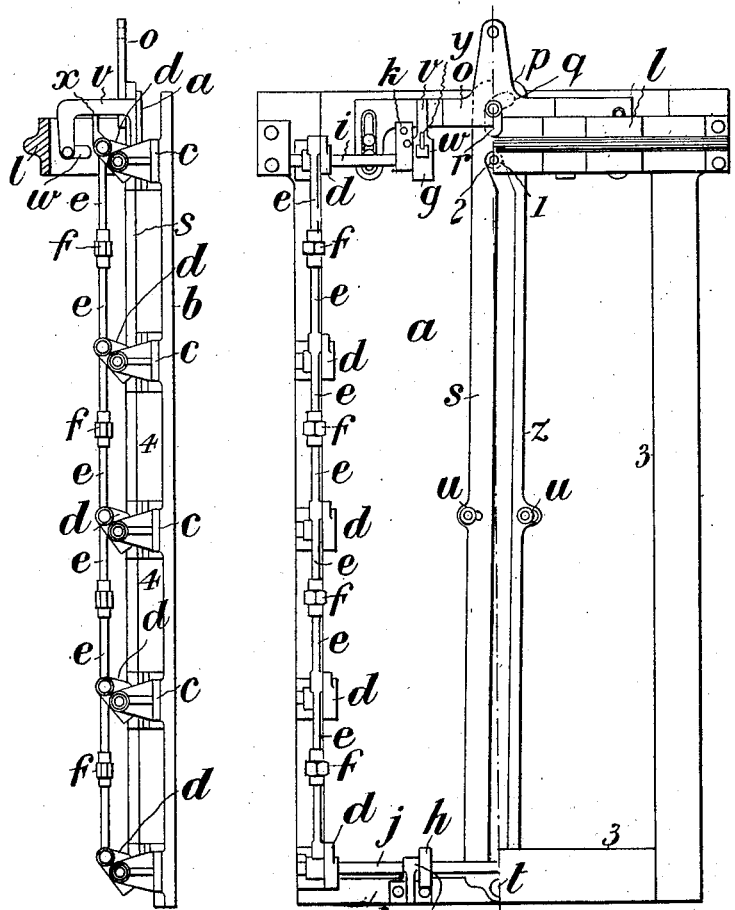
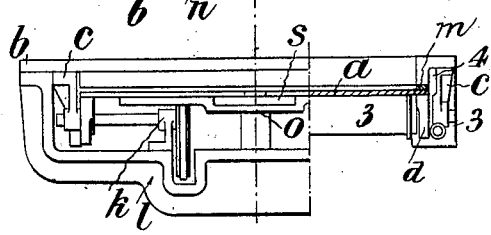

No. 829,352. PATENTED AUG. 21, 1906.
G. C. RALSTON.
DEVICE FOR OPERATING BULKHEAD DOORS.
APPLICATION FILED JUNE 8, 1904.
4 SHEETS—SHEET 2.
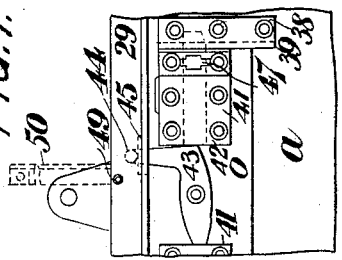
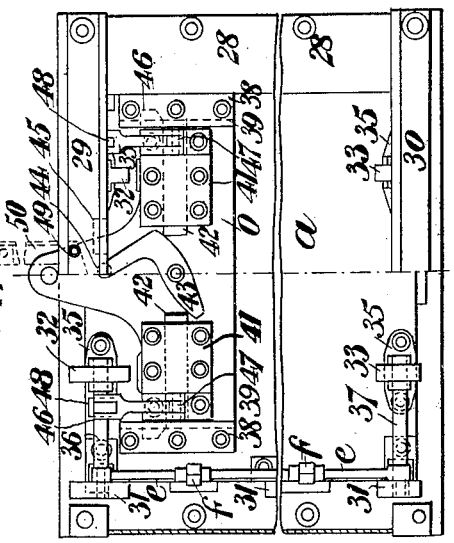
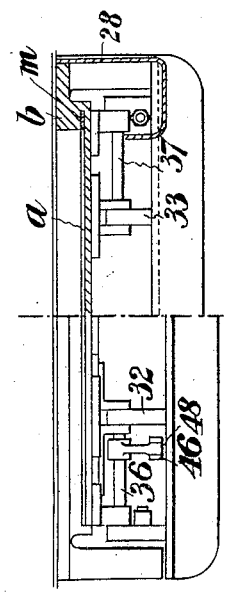
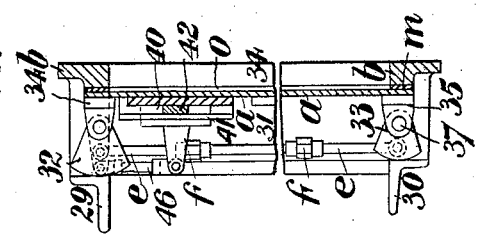

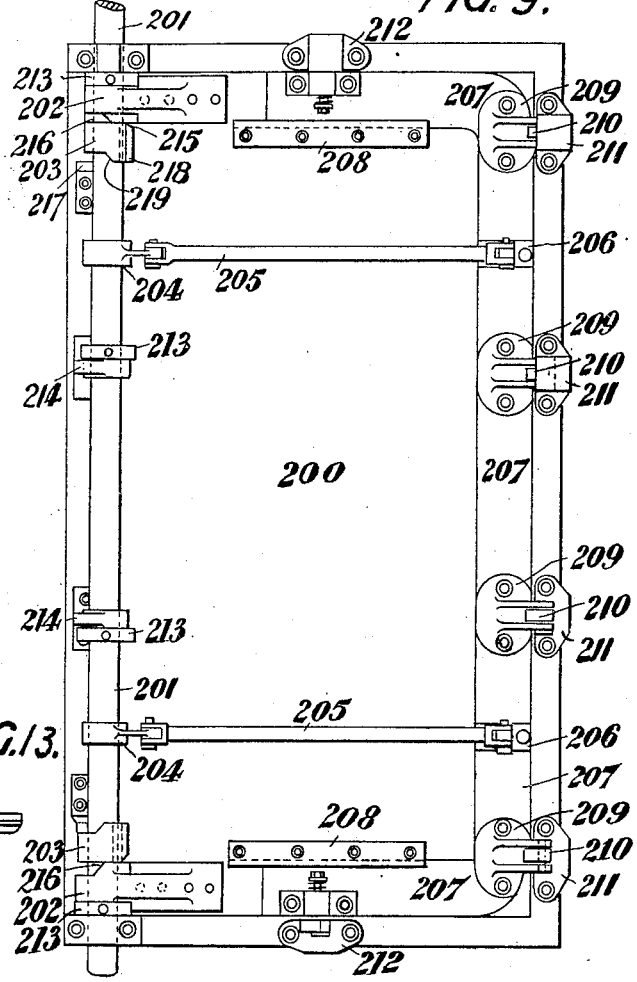

No. 829,352. PATENTED AUG. 21, 1906.
G. C. RALSTON.
DEVICE FOR OPERATING BULKHEAD DOORS.
APPLICATION FILED JUNE 8, 1904.

4 SHEETS—SHEET 4.

Inventor,
Gavin Carlyle Ralston.
by Henry Orth Jr
Attys.

Witnesses:
O. T. Ober.
B. V. Sommers

UNITED STATES PATENT OFFICE.

GAVIN CARLYLE RALSTON, OF LEWISHAM, ENGLAND.

DEVICE FOR OPERATING BULKHEAD-DOORS.

No. 829,352.　　　Specification of Letters Patent.　　　Patented Aug. 21, 1906.

Application filed June 8, 1904. Serial No. 211,697.

*To all whom it may concern:*

Be it known that I, GAVIN CARLYLE RALSTON, a subject of the King of Great Britain and Ireland, residing at Lewisham, in the county of Kent, England, have invented new and useful Improvements in Devices for Operating Bulkhead-Doors, of which the following is a specification.

This invention consists in the application of cams or eccentrics with a pressing-surface of a spiral or other suitable curved outline, these cams being so combined as to operate simultaneously and with a rolling motion for effecting tight joint between the door and the fixed frame in an instantaneous manner and for similarly undoing the joint without any risk of sticking, which is apt to happen with wedge-shaped bolts that are shot into housings and have no rolling motion.

My invention is illustrated in the accompanying drawings, in which—

Figure 14:
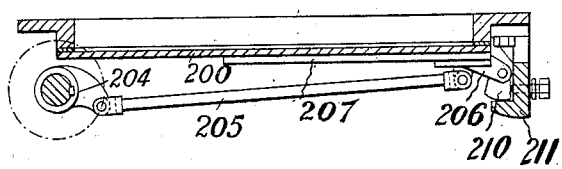
Figure 15:
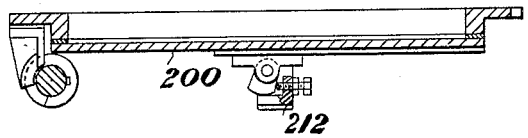
Figures 16, 17:
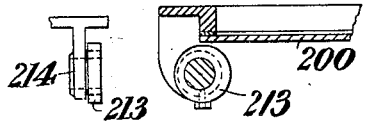
Figures 18, 19:
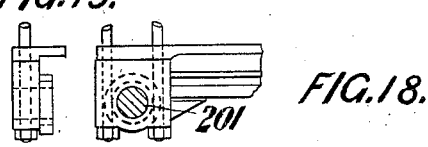

Figure 1 is a front elevation, one half showing the casing removed, Fig. 2 a sectional side view, and Fig. 3 a horizontal section, of a ship's bulkhead-door fitted according to this invention. Fig. 4 is a front elevation, one half showing the casing removed, Fig. 5 a sectional side view, and Fig. 6 a horizontal plan and section, of a bulkhead-door with modified form of moving gear. Figs. 7 and 8 illustrate another position of the said gear. Fig. 9 is a front elevation, Fig. 10 a sectional side elevation, and Figs. 11 to 19 detail views, showing the invention applied to a laterally-hinged bulkhead-door.

In Figs. 1, 2, and 3 the door $a$, which may be of sheet-steel or sheet-iron or cast-iron, works with usual gun-metal facings $m$ against the fixed frame $b$ and between lateral guides 4. Upon the frame $b$ are fixed brackets $c$, on which are mounted cams $d$, that are connected by links $e$, provided with right and left hand nuts $f$ for accurate adjustment of the cams for uniform or simultaneous action. Cams $g$ and cams $h$ are provided on the same shafts $i$ and $j$ as the top and bottom pairs of cams $d$. The top cam-shaft $i$ works in brackets $k$, fixed to a bridge $l$, that is fixed to the frame $g$. The bottom cam-shaft $j$ works in brackets $n$, fixed on the frame $b$.

The door is normally free to be slid up and down on the frame $b$, but is locked in position—that is to say, pressed against the frame $b$—when it comes to the extreme lower end of its travel. The power to operate the door is applied to a sliding bar $o$, which until released is supported by a pin $p$, that is secured to the bar $o$ and carries a roller $q$, which rests in the horizontal part of the right-angled slot $r$ in a swinging or rocking link $s$, which is pivoted to the bottom of the door $a$ by a pin $t$. Other pins or bolts $u$, riveted to the doors and working in slots in the rocking link $s$, allow it lateral movement in the direction of the slot only.

The sliding bar $o$ is provided with two locking-arms $v$, which are adapted to drive the cams down and which are fitted with lifting-fingers $w$, that are lifted, and so unlock the cams when the door travels upward, and that double over and clear the fingers $x$ on the uppermost pair of cams when the door travels downward. Each finger $w$ is fitted with a small spring $y$ to bring it back to the lifting position. The rocking link $s$ has a slot $z$ nearly the whole of its length, said slot being angularly inclined at the top and in which travels a roller 1, carried on a pin 2, attached to the bridge $l$. The lengths of the slot $z$ are so arranged that when the door is traveling down the roller 1 in the slot $z$ keeps the rocking link vertical, the sliding bar $o$ driving the door; but when the door is nearly closed the roller 1 is in the inclined part of the slot $z$ and throws over the rocking link $s$, so that the pin $p$ and the roller $q$ on the sliding bar $o$ travel across the slot $r$. By this time the door is closed, and the sliding bar $o$ is then free (by reason of the roller $q$ traveling down the slot $r$) to slide on the door without driving it (which I call "lost motion") and to operate the cams $d$ by the locking-arms $v$. The sliding bar $o$ is at each end provided with slots wherein work headed screws which are fixed to the door. The bridge $l$ is hollowed out opposite each of the locking-arms $v$ to allow them to pass. Gear-cases 3 are for the purpose of keeping out dirt fitted to the sides and bottom and top, and the bottom of the bridge may also be cased in as far as possible.

In opening the door the lifting-arms $v$ on the sliding bar $o$ lift the cams $d$ by means of the finger $w$, which passes over the finger $x$ when the cams are unlocked. At the same time the bar $o$ is sliding on the door $a$, while the pin $p$ and roller $q$ are traveling up the slot $r$. When the top of this slot is reached, the bar $o$ lifts the rocking link $s$, and with it the door $a$, whereupon the roller 1 throws the rocking link $s$ back into the vertical position.

Figs. 4 to 8 represent a modification in which the cams and all the other mechanism are fitted to the door, and therefore when the door is in use—i. e., open—all the mechanism is out of harm's way. b is the door-frame, which has channel-shaped side plates or cases. T or L shaped bridges 28 and 30 are carried across at top and bottom. The cams 31 32 33, mounted in brackets 34 35, are under the bridges and are connected by rods e and nuts f, as in Figs. 1 to 3. The top and bottom cams 32 and 33 are connected to those at the sides by horizontal spindles 36 37.

The arrangement for giving the lost motion to the sliding bar o consists of two guide-pieces 38, bolted or riveted to the door and fitted with overlapping top plates 39, fixed on by screws. Onto the sliding bar o are fixed two pairs of guides 40, with top plate 41, fixed on by screws. In these guides two bolts 42 can slide, the outer ends of which have inclined planes. These bolts are normally locked into the guide-pieces 38 by a double cam 43, which is released during the last part (lost motion) of the downward movement of the door by an arm 44 on the cam 43 striking against a projection 45 on the inside of the bridge 28. Immediately the cam is rotated toward the left the downward pressure on the bolts 42 forces them out of the recesses in the guides 38, and the sliding bar o then locks the cams 31 32 33 by means of the links 46, which are jointed to brackets 47 on the sliding bar o, and the levers 48, which are fixed on the top cam-shaft 36.

In opening or raising the door the sliding bar o unlocks the cams 31 32 33 while traveling up in the guides 38. As the bolts 42 arrive opposite the recesses in the guides 38 the cam-lever 44 strikes an inclined plane 49, Fig. 4, which brings the cam 43 to its original position, wherein the bolts 42 are locked. A guide 50 maintains the lever 44 in position during its up-and-down travel. The cam 43 may have its return action effected by a coiled spring instead of the inclined plane 49, in which case the guide 50 will also be dispensed with.

Figs. 9 to 19 show the combined cam action applied to a laterally-hinged door. The door 200 is hinged on the lateral vertical shaft 201, which is turned by a connection from the door-cylinder in the direction of opening or closing. The door is connected with the shaft by a clutch-bracket 202, provided with inclined planes 216 and fixed on the door, and on the shaft are clutch-sockets 203, provided with inclined planes 215 and 219 and a plane surface 218. These sockets are mounted on feathers on the shaft so that they can slide in and out of engagement with the clutch-brackets 202, guides 217 being also provided to regulate the engagement of these parts. On the shaft 201 are also fixed levers 204 204, which by rods 205 205 are connected to brackets 206 206, that are fixed on a frame or bar 207, the upper and lower limbs of which rest somewhat freely under the ledges 208 208 on the door. Upon the bar 207 are fixed brackets 209, which carry pivoted cams 210, that can be brought to bear against the under side of brackets 211, which are fixed on the fixed frame or bulkhead. Somewhat similar brackets 212 are fixed at the top and bottom. On the brackets 202 and 214 are fixed eccentrics 213, which when the door is turned to the closing position press it against the fixed frame. In closing the door power is applied to rotate the hinge-shaft 201, the sockets 203 by means of the inclined planes 215 216 driving the brackets 202, which are fixed on the door, thus carrying the latter along to the closed position, the sockets 203 being kept in engagement with the brackets 202 by means of guides 217 being in contact with the planes 218 of the sockets 203. When the door reaches the closed position, the guides 217 have passed clear of the planes 218 on the sockets 203, and on further turning the shaft 201 in the same closing direction the inclined planes 215 run up the inclined planes 216, throwing the sockets 203 out of engagement with the brackets 202, leaving the door-shaft free to drive the cams only by means of the levers 204, thus driving the frame 207 (on which the cams are mounted) by means of the rods 205. The cams 210 are then by the frame 207 carried beneath the brackets 211 and 212. The cams are so formed that by striking the back of the brackets 211 212 the further movement of the frame 207 locks them onto the door 200, forcing it onto its face, the door also wedging itself under the fixed cam 213. In opening the door the backward rotation of the shaft 201 unlocks the cams 210 and withdraws them from under the brackets 211 212. By this time the inclined planes 219 on the sockets 203 have engaged with the guides 217, which have forced the sockets 203 back into contact with the brackets 202, thus allowing the shaft 201 to again drive the door to open it. In the course of opening the door disengages itself from under the cams 213 on the hinged side and is then perfectly free.

What I claim as my invention, and desire to secure by Letters Patent, is—

1. The combination of a fixed door-frame, the door, a series of pivoted cams arranged at intervals along its circumference, means for connecting said cams, means for simultaneously turning them, and means for moving the door parallel to the frame, whereby the door is pressed tightly against the door-frame by the cams.

2. The combination of a fixed door-frame, the door, a series of pivoted cams arranged at intervals along its circumference, means for connecting the cams, means for moving the door parallel with the frame and a lost-motion connection between the door and the aforesaid means, whereby the door is first moved so as to close and then becomes disengaged and thereupon the cams by the said means are simultaneously turned and thereby press the door tightly against the doorframe, substantially as set forth.

3. The combination of a fixed door-frame, the door, a series of cams pivoted to the said frame at intervals along its circumference, means for connecting the cams, means for moving the door parallel with the frame, a stop on the latter, and a lost-motion connection between the door and the aforesaid means for moving it whereby the door is first moved as far as the stop and then becomes disengaged and thereupon the cams by the said means are simultaneously turned and thereby press the door tightly against the door-frame, substantially as set forth.

4. The combination of a fixed door-frame, the door, a series of cams pivoted to the said door at intervals along its circumference, means on the door for connecting the cams, means for moving the door parallel with the frame, a stop on the latter, and a lost-motion connection between the door and the aforesaid means, whereby the door is first moved as far as the stop and then becomes disengaged and thereupon the cams by the said means are simultaneously turned and thereby press the door tightly against the door-frame, substantially as set forth.

In testimony whereof I have signed my name to this specification in the presence of two subscribing witnesses.

GAVIN CARLYLE RALSTON.

Witnesses:
V. JENSEN,
G. F. WARREN.